US005190805A

United States Patent [19]

Atherton et al.

[11] Patent Number: 5,190,805

[45] Date of Patent: Mar. 2, 1993

[54] ANNOTATABLE INK JET RECORDING MEDIA

[75] Inventors: David Atherton, North Kingstown; Sen Yang, Warwick, both of R.I.

[73] Assignee: Arkwright Incorporated, Fiskeville, R.I.

[21] Appl. No.: 762,978

[22] Filed: Sep. 20, 1991

[51] Int. Cl.[5] .......... B32B 9/00

[52] U.S. Cl. .......... 428/195; 428/201; 428/206; 428/323; 428/331; 428/402; 428/914

[58] Field of Search .......... 428/195, 212, 201, 202, 428/331, 357, 206, 372, 914, 402

[56] References Cited

U.S. PATENT DOCUMENTS

| | | | |
|---|---|---|---|
| 3,889,270 | 6/1975 | Hoffmann et al. | 428/195 |
| 4,300,820 | 11/1981 | Shah | 428/195 |
| 4,379,804 | 4/1983 | Eisele et al. | 428/332 |
| 4,481,244 | 11/1984 | Haruta et al. | 428/155 |
| 4,555,437 | 11/1985 | Fanck | 428/212 |
| 4,564,560 | 1/1986 | Tani et al. | 428/411.1 |
| 4,578,285 | 3/1986 | Viola | 427/209 |
| 4,649,064 | 3/1987 | Jones | 427/256 |
| 4,785,313 | 11/1988 | Higuma et al. | 346/135.1 |
| 4,857,386 | 8/1989 | Butters et al. | 428/206 |
| 4,868,581 | 9/1989 | Mouri et al. | 428/195 |
| 4,935,307 | 6/1990 | Iqbal et al. | 428/500 |
| 5,002,825 | 3/1991 | Mimura et al. | 428/315.5 |
| 5,013,609 | 5/1991 | Niebylski | 428/450 |

*Primary Examiner*—Patrick J. Ryan
*Assistant Examiner*—William Krynski
*Attorney, Agent, or Firm*—Birch, Stewart, Kolasch & Birch

[57] ABSTRACT

A film medium useful in ink jet printing which film comprises a transparent or opaque substrate, having on at least one side therof an annotatable water-in-soluble, water-absorptive and ink-receptive matrix, said matrix comprised of a hydrogel complex and a pigment.

24 Claims, 1 Drawing Sheet

ANNOTATABLE INK JET RECORDING MEDIA

FIELD OF THE INVENTION

This invention provides novel annotatable ink jet recording media which are suitable for design engineering and technically allied applications such as architectural and seismographic recording.

BACKGROUND OF THE INVENTION

In recent years, printers using sprayable inks, such as the ink jet printer, have come into general use. These printers, which employ ink jet heads having small orifices that propel inks in a continuous stream of drops or in minute individual drops on demand, are used in various electronic printing applications. They offer not only high speed but quiet operation without the need for external developing or fixation procedures. Thus, ink jet printing is highly suitable for electronic printing in applications such as computer aided drafting, architectural renditions and seismographic recording.

Although transparent films are available for ink jet applications, they lack the necessary qualities for engineering and its allied applications. In order to realize the full potential of these applications, ink jet films must provide imagery of sufficient density and resolution and a surface suitable for ink and pencil annotation. Ink jet prints may be used as "originals" much like those of hand rendered drawings. In addition, they must be able to serve as "intermediates" suitable for transmissive and/or reflective copying. This latter requirement relates to engineering applications where it is a common practice to use an intermediate as the master to produce many release copies. These copies are then distributed both internally and to manufacturing subcontractors, among others. Changes and additions may be made on the intermediate prior to its use as a master for making copies.

Ink jet systems employed in informational electronic printing are comprised of three components: the printer, the ink and the receptor sheet. The printer controls the size, number and placement of the ink droplets and contains the transport system. The ink provides the colorants which form the image, and the receptor sheet provides the medium which accepts and holds the ink. The quality and archivability of ink jet prints is a function of the total system. However, the composition and interaction of the ink and the receptor material most affect the quality of the imaged product.

Ink compositions which are useful in ink jet recording systems are well known and generally contain water, organic solvents and dyes. There is thus disclosed, for example, in European Patent 0,294,155, an ink jet composition useful in ink jet recording consisting of water based vehicle containing about 30–99% wt. water with the balance made up of high boiling solvents such as glycols, glycol ethers, pyrrolidones and surface active agents. For engineering and allied uses, the inks employed contain preferably acid or direct dyes and are most generally black, though colored inks are sometimes utilized. So called "solid inks" are beginning to be employed and are contemplated in this invention.

Film recording media represent a special problem in ink jet recording because their surfaces are hydrophobic or quasi-hydrophobic. Even when surfaces are treated with special coatings to accept and absorb the inks, it is difficult to obtain the requisite qualities of image density and resolution without incurring offset, smear, bleed or other undesirable properties.

Ink jet printers apply small ink droplets in a selective pattern to form the images. These droplets are absorbed into the coating on the film surface. After initial absorption, the dye continues to spread laterally. Concurrent rapid diffusion into the film matrix is also important to avoid smear and offset. Thus, the ink absorptive qualities of the ink receptive matrix of the film is of paramount importance.

There is considerable literature which describes attempts to provide the optimal receptor sheet. A general approach to the problem of hydrophobic surfaces is discussed in U.S. Pat. No. 4,503,111, which teaches the use of a surface coating to absorb the ink. In addition, a wide variety of polymers alone or in admixture have been proposed for use as surface coatings; see for example, U.S. Pat. Nos. 3,889,270; 4,555,437; 4,564,560; 4,649,064; and 4,578,285. Multiple coatings have also been employed in trying to overcome the various problems associated with hydrophobic nature of recording media; illustrative of these coatings are U.S. Pat. No. 4,379,804, Japanese Patent No. 01041589 and Japanese Disclosure Numbers 86-86-074879 and 86-41549. Coatings containing inorganic fillers are disclosed in U.S. Pat. Nos. 4,481,244, 5,002,825 and 5,013,609.

SUMMARY OF INVENTION

This invention pertains to the role the receptor medium plays in achieving an annotatable ink jet film of high quality suitable for use both as originals and intermediates. More specifically, the present invention provides ink receptive media such as the following:

(a) a matte film composite, which comprises a transparent or opaque substrate, having on at least one side thereof a water-insoluble, water-absorptive and ink receptive matrix layer, such matrix layer comprising a hydrogel complex and a pigment, which pigment has a MOH hardness of from about 2.2 to 7.0, and a Critical Integrity Value (as defined herein), of at least 20 g;

(b) a matte film composite as recited in (a) having a coating on the opposite side of the ink receptive matrix layer (i.e., a backcoat) which assists in minimizing ink offset and/or blocking and in providing transport reliability; and (c) a matte film composite as recited in (a) or (b), having a topcoat layer on the ink receptive side thereof, that is more absorptive than the matrix underlayer.

The invention is also concerned with a method of producing ink jet prints and with ink jet printing systems, which utilize the above described ink jet receptor media, among others. Furthermore, the invention addresses the requirements for improved ink jet films and like media and their broader application to new products.

BRIEF DESCRIPTION OF THE DRAWINGS

The present invention will become more fully understood from the detailed description given here and below and the accompanying drawings which are given by way of illustration only, and thus, are not limitative of the present invention, and wherein.

DETAILED DESCRIPTION OF THE INVENTION

Figure 1:
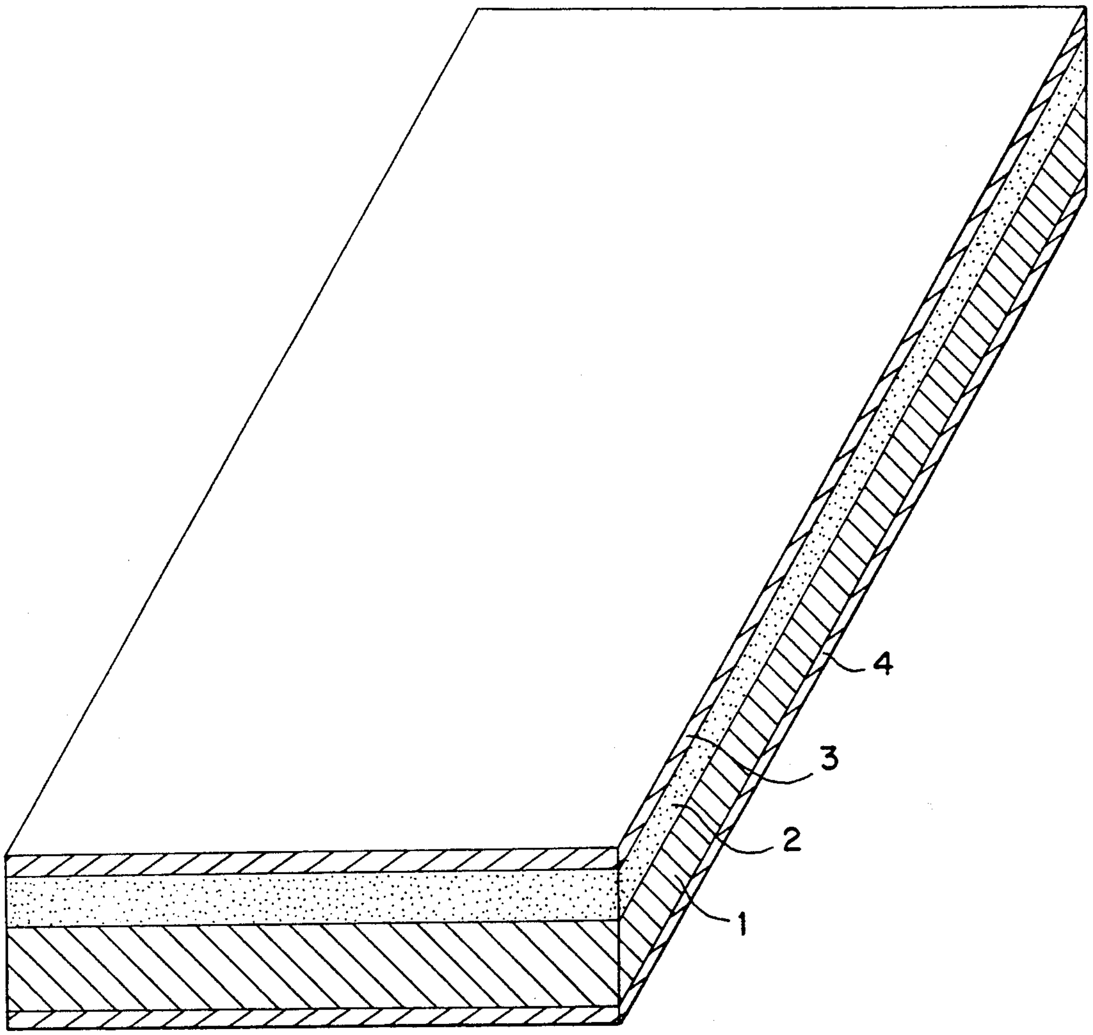
FIG. 1 is an illustration of a film composite of the present invention, wherein (1) is a base support, (2) is an ink receptor matrix layer, (3) is a topcoat layer, and (4) is a backcoat layer.

The following detailed description and Examples are provided to aid those skilled in the art in practicing the present invention. Even so, the present inventive discovery is not to be unduly limited by the disclosures made herein, since those of ordinary skill in the art may prepare equivalent ink jet receptor media and/or ink receptor coatings which do not depart from the spirit or scope of the present inventive discovery.

The matte film composites encompassed by the present invention possess a base support having thereon a water-insoluble, water-absorptive and ink-receptive matrix layer, which comprises a hydrogel complex and a pigment possessing a specific particle size distribution and MOH hardness and a Critical Integrity Value of at least 20 g when tested by the method disclosed herein. Each of the above components of the present inventive media are discussed in detail below.

The base supports for the ink receptor matrix layers may be selected from any suitable film such as polyethylene terephthalate, cellulose acetate, polystyrene, polycarbonate, polyolefin or other polymeric film base supports. These film supports may be translucent or opaque depending on the application. The base supports generally possess a thickness of from about 25 to 175 microns. In order to make the film support more receptive to the ink receptor matrix layer formulation to be applied thereto, its surface may be pretreated with an adhesion promoting substance, or may be coated with an intermediate subbing layer as generally known in the art. Alternatively, a paper base support may be employed which has a discrete film layer over its surface applied by coating or lamination at least on the ink receptive side. Such paper/film laminates may possess a thickness greater than those recited above.

The use of a water-insoluble hydrogel is an important element in this invention. It provides rapid absorption of both glycol and aqueous inks while remaining insoluble. Additionally, it provides an effective medium for containing the various additives that are utilized to produce the desired matrix properties. The selection of the polymers and the solvents in which they are dissolved determine whether a suitable hydrogel will form.

Hydrogels encompassed by this invention include those formed through the complexing of a poly(N-vinyl heterocyclic) moiety and a complexing agent such as a water-insoluble comb graft polymer.

Typical poly(N-vinyl heterocyclics) which can form hydrogels encompassed hereby are poly(N-vinyl pyrrolidone), poly(N-vinyl-4-methyl-2-oxazolidone) and the like.

The water-insoluble complexing agents most suitable for hydrogel formation with poly (N-vinyl heterocyclic) moieties are comb graft copolymers having a hydrophobic backbone and hydrophilic side chains. These comb graft copolymers are very effective in forming such waterinsoluble hydrogels.

Suitable water-insoluble complexing comb-graft copolymers encompassed hereby possess backbone chains comprising substituted and unsubstituted forms of polyesters, polyurethanes, polyacrylic and polymethacrylic esters, vinyl polymers (such as polyvinyl chloride and polyvinyl acetate), diene polymers (such as polybutadiene), polyolefins (such as polyethylene and polypropylene), cellulose and its derivatives (such as cellulose esters and mixed esters), polystyrene, and copolymers of the foregoing. Polymers and copolymers particularly suitable for forming the hydrophilic side chains of the water-insoluble combgraft copolymers include substituted or unsubstituted poly(hydroxy-alkylacrylates and methacrylates), poly(acrylic and methacrylic acid), poly(N-vinyl pyrrolidone), poly(hydroxyalkyl methacrylate/N-alkylolacrylamide), poly(vinyl alcohol), poly(acrylamide) and quaternary ammonium moieties. Preferred embodiments of complexing comb-graft copolymers include those wherein poly(methyl-methacrylate) is the hydrophobic backbone and hydroxyethylmethacrylates are the hydrophilic side chains, or poly(methylmethacrylate) is the hydrophobic backbone and poly(N-vinyl pyrrolidones) are the hydrophilic side chains.

The inventors have found rather surprisingly that the choice of solvent used in the coating formulation plays an important role in the formation of the hydrogel complex. For example, the use of water or methylcellosolve can inhibit the formation of the hydrogel complexes, whereas the use of certain glycol ethers has proved useful in forming hydrogels in conjunction with poly (N-vinyl heterocyclic) moieties and water-insoluble comb-graft polymers, such as described herein. Particularly methylated ethers such as propylene glycol monomethyl ether form superior water resistant hydrogel complexes. It is not understood why certain solvents have an adverse effect on hydrogel formation. Possibly, adverse effects may result from competition by the more hydrophilic solvents for the complexing sites.

The weight ratio between the hydrophobic backbone chain and the hydrophilic side chains in the complexing comb-graft copolymers of the present invention may vary within a wide range from 10 to 90 up to 90 to 10 so long as the copolymer remains essentially water-insoluble. The use of complexing comb-graft copolymers in which the weight ratio of the hydrophobic backbone to the hydrophilic side chain is between about 50 to 50 and 90 to 10, is preferred. In any case, it is important that the ratio of the hydrophilic side chain to the hydrophobic backbone not exceed that ratio which would confer water solubility to the comb-graft copolymer.

The graft copolymers used according to the invention can be prepared by techniques well known in the art. A survey of manufacturing techniques for such graft copolymers can be found in the book series "Block and Graft Copolymerization" edited by R. J. Ceresa and published by John Wiley & Sons, N.Y., 1976.

Mixtures of two or more comb-graft copolymers, for instance a comb-graft copolymer having a high content of hydrophilic side chains of about 70 to 90% by weight with a comb-graft copolymer having a considerably lower content of hydrophilic sites, for instance of about 20 to 35% by weight, also can be complexed with poly(N-vinyl heterocyclic) moieties to form hydrogels, and thus can also be used in formulating satisfactory ink receptor matrix layers.

Generally the components of the hydrogel can be used alone or in combination with such additives as wetting, antistatic, antisettling and dispersing agents, and the like. The exact structures of the hydrogel complexes of this invention are not known. However, it is believed that in the instance of a hydrogel complex of a comb-graft copolymer and a poly(N-vinyl heterocyclic) moiety, the hydrophilic segments of comb-graft copolymers and the hydrophilic heterocyclic moiety of the N-vinyl heterocyclic form the complex. But whatever their structure may be, the hydrogel complexes encompassed hereby confer upon the ink receptor matrix layers a high affinity for both water-based and high glycol inks while remaining water-insoluble. Thus such ink receptor matrix layers help provide high image density and brightness and lack of smear and offset to the present inventive media.

It has been surprising found that relatively small amounts of the water-insoluble comb-graft polymers (in the range of about 5 to 35%) are sufficient to produce highly absorptive water-insoluble hydrogel complexes with poly(N-vinyl heterocyclic) moieties. By contrast, simple block or random copolymers of hydrophobic and hydrophilic units require a much higher proportion of such copolymers to form water-insoluble compositions. Moreover, the complexes formed with these block or random copolymers do not have the high water absorptivity of the poly(N-vinyl heterocyclic) combgraft copolymer complexes disclosed herein. As a possible explanation, it may be that such random or block copolymers do not form hydrogel complexes with poly(N-vinyl heterocyclic) moieties and thus do not provide a composition possessing high water absorptivity.

According to one of the most preferred embodiments of the invention, the ink receptor matrix layer comprises a mixture of about 65 to about 90% by weight of a poly(N-vinyl heterocyclic), most preferably poly(N-vinyl pyrrolidone), and about 35 to 10% by weight of a comb-graft copolymer. The graft copolymer preferably comprises 15 to 40% by weight of hydrophilic side chains (preferably consisting of poly(hydroxyalkylacrylate or hydroxyalkylmethacrylate) or polyvinylpyrrolidone) and 85 to 60% by weight of a hydrophobic backbone (preferably consisting of poly(methylmethacrylate)). Such ink receptor matrix layers are highly ink absorbent and yet water-insoluble.

The pigments used in the present invention are selected to achieve a unique set of properties required in ink jet printing. Foremost among these is the need for rapid drying of the ink to avoid offset and smear in the stacking tray during the printing process. The pigments are also selected to help provide good image density through their effect on lateral ink dot diffusion. The pigments chosen also must be sufficiently abrasive or hard to ensure good density of pencil annotations. Also, pigments may be employed containing multivalent cations to help provide dye mordanting properties. In applications that require ultraviolet transmissive copying, such as in diazo copying processes, the pigment chosen must not unduly absorb ultraviolet and visible light. Furthermore, the matrix containing the pigment must neither absorb nor excessively scatter light in those regions.

The hydrogels of this invention provide good ink drying properties but they are insufficient to provide adequately rapid drying for the intended applications. Drying is considerably enhanced through the use of a pigment and a pigment concentration which provides a high void volume. However, an excessively high void volume will cause the matrix to lose its cohesiveness or physical integrity. As such, the pigment and pigment concentration are selected so that the matrix layer does not have a Critical Integrity Value less than 20 g. The Critical Integrity Value can be found by producing coatings of increasing pigment to binder ratios until the coatings become too weak for their intended uses, i.e., they no longer possess adequate cohesiveness. For the purpose of this invention, the Critical Integrity Value (loss of cohesiveness) can be determined by using a GARDNER Balanced Beam Scrape-Adhesion and Mar Tester, according to ASTM 2197 test method employing a Hoffman tool. The minimum weight which will produce a first penetration through the ink-receptive matrix layer by the Hoffman tool is designated as the Critical Integrity Value (The test procedure is described below). The Critical Integrity Value of the matrix layer is at least about 20 g when determined in accordance with the test method provided herein.

It has been found that the higher the mass ratio of pigment to hydrogel in the matrix layer, the higher the void volume, the faster the drying rate and the higher the image density. Conversely, the lower said mass ratio, the greater the cohesive strength of the layer and the resolution of the image, but the slower the rate of drying and the lower the image density. In practice, the best balance of properties is found close to, but not less than, the Critical Integrity Value of 20 grams. It has been found that the pigment to hydrogel mass ratio that is required to equal or exceed the Critical Integrity Value will vary with the pigment and binder. Thus, a suitable selection of these materials is undertaken prior to determining the optimal mass ratio of pigment to hydrogel. The optimal mass ratio of a pigment to hydrogel is determined by assessing the important performance qualities desired and selecting those which give the best balance of properties.

A suitable balance of properties is achieved when the mass ratio of pigment to hydrogel is about 0.2:1 to 3.5:1, but more suitably the mass ratio is about 0.5:1 to 2:1, and the average particle size is about 0.5 to 10 microns and preferably about 2.0 to 6.0 microns. Pencil annotatability is achieved by selecting a pigment with a MOH hardness of from about 2.2 to 7.0, preferably from about 4.0 to 7.0. Where ultraviolet transmissive-ness is required, the pigment selected has a refractive index of from about 1.4 to 1.7. Ink annotatability of conventional pen inks is achieved by virtue of the inventive hydrogel employed. Additionally, the pigment to hydrogel ratio is selected within the specified range to adjust the dot spread to best suit the ink and ink applying system.

There are preferred pigments which are employed with the hydrogel of this invention which provide the requisite annotatability, rapid drying, image density and actinic transmissiveness. These include amorphous and crystalline silica, aluminum trihydrate, calcium carbonate, potassium sodium aluminum silicate, diatomaceous earth, silicates of aluminum and magnesium and mixtures thereof. However, not all pigments are generally suitable as the major pigment constituent in the ink-receptive matrix. These include polyolefin particulates and like organic materials, talc, zinc oxides, lithopone, fumed silicas and titanium dioxide, among others.

At times it may be desirable to increase the visual contrast of the imaged matte films. This may be accomplished by the addition of a very small quantity of a white, opaque pigment such as titanium dioxide or barium sulfate/zinc sulfide. Typical concentrations of these pigments are from about 1 to 10% by weight to the total pigment weight and preferably about 1.0 to 3.0% by weight.

In all, the pigment and the pigment to hydrogel mass ratio in the ink receptive matrix must conform to the requirements described above.

In transmissive copying, the pigment selected must have a refractive index of from 1.40 to 1.65 and preferably at or close to the refractive index of the hydrogel utilized. For reflective copying, it may not be necessary to have an actinically transmissive matte film. Consequently, an opaque base support may be utilized and/or the pigments in the matrix may be of a higher refractive index than specified for transmissive films.

The matte composites of this invention may utilize a topcoat, if so desired to help control the diffusion rate of the ink between lateral spread and penetration. The ideal diffusion balance is where the ink dots spread just enough to fill in the white areas between the dots so as to achieve high image density. Excessive ink dot spread will cause loss of image resolution. Alternatively, such a topcoat may be used to produce desired surface properties such as pencil tooth and/or pencil erasure and receptivity of pen inks. Preferably, the topcoat is more absorptive than the matrix layer.

In practice, the surface properties of the ink jet matrix layer may be modified to alter the matrix layer's characteristics in the following ways. For example, a water-soluble topcoat or overcoat may comprise hydrophilic polymers such as polyvinyl alcohol, hydroxymethyl cellulose, hydroxyethyl cellulose, hydroxypropylmethyl cellulose and carboxymethyl cellulose, either alone or in combination or in admixture with a poly (N-vinyl heterocyclic) moiety such as described herein (e.g., poly(N-vinyl pyrrolidone)). The topcoat layer may also contain a comb-graft copolymer of the type used in the ink receptor matrix layers disclosed herein, preferably having a hydrophilic side chain content of about 30 to about 70% by weight. For example, a surface layer containing a polymeric binder and pigment may be employed over the matrix layer to modify drafting properties and/or to provide good pencil erasure.

Conventionally, a coating is employed on the backside, or on the side opposite to the image-receptive layer of an imaging film; the backcoat comprising a pigment and a binder. This is to help provide reliable transport through an imaging device and to balance the tension on the two sides of the film so that the print will lie flat. For some ink jet printers, the backcoat of this invention requires an additional and important quality. It must provide "spacers" to keep the freshly imaged film that goes into the stacking tray of the printer separated from the next on-coming print, since some ink jet printers deliver prints image side down into stacking trays. Thus, if the spacing between the prints is not substantial, ink offset may result. The inventors have discovered that the offset problem can be mitigated by providing a non-ink-absorbent backcoat with a spacer pigment therein which holds the sheets apart. The pigments employed for this purpose include amorphous and crystalline silicas, starch, microcrystalline cellulose, partially sulfonated polystyrene ionomers, hollow sphere polystyrene beads and the like. The average particle size of the pigment is important and is in the range of 10 to 30 microns and preferably 15 to 20 microns. The film backcoat should have a Sheffield reading of 80–270 Sheffield units. Below 80, insufficient spacing is achieved to be effective and above 270, the coatings become unacceptably rough in appearance. Typical of binders used in the backcoats disclosed herein are polymers that are not water absorptive, such as the acrylates, methacrylates, polystyrenes and polyvinylchloride-polyvinylacetate copolymers.

For some printers and applications, it is advantageous to utilize a conventional drafting surface on the non-imaging slide of the matte films, as is well known in the art. This will permit additions to be made on the back side of the film. In such circumstances, the image on the face side is reverse reading.

The coating weight of the ink receptive matrix is dependent upon the type and quantity of ink applied. However, the ink receptive matrix layers are generally applied to film supports in an amount of about 2 to about 20 $g/m^2$ and preferably in an amount of about 3 to about 10 $g/m^2$. The topcoat layers referred to herein are preferably applied to the ink-receptor matrix layers in an amount of about 0.1 to about 2.0 $g/m^2$, or an amount sufficient to modify the surface characteristics of the film composite. The backcoat layers referred to herein usually possess coating weights of 2 to 12 $g/m^2$, preferably from 4 to 8 $g/m^2$. Any of a number of methods may be employed in the production coating of the individual layers in the film composite of the present invention, such as roller coating, wire-bar coating, dip-coating, air-knife coating, slide coating, curtain coating, doctor coating, flexographic coating, or gravure coating. Such techniques are well known in the art.

In most of the embodiments of the present invention described above, there generally exists a film substrate having a ink-receptor matrix layer applied thereto, and optionally a topcoat layer and/or a backcoat layer. Even so, there are also encompassed by the present invention coated film composites wherein the base support thereof comprises a polymeric film which is laminated or coated onto a paper or paper product.

Although the primary application of the ink-receptive matrixes of this invention are in ink jet printing, their properties make it useful for offset printing, pen recording, manual drafting and like imagemaking processes.

This invention is illustrated in more detail in the following Examples. The chemical names listed for the individual components of the formulations are those believed to represent the manufacturers' trade name. In the Examples, "parts" are all by weight.

The following general procedure was used for the preparation of the recording medium according to the examples.

A polyethylene terephtalate film is used as either a light-transmissive substrate for transmissive copying or a light-reflective substrate for reflective copying or use. Either type substrate may be used to create an original record. The film was coated by means of a Meyer rod on one of its surfaces with the formulations according to each of the following Examples. The coated samples are dried in a circulating hot air oven at about 250° F. for two to three minutes.

Monochromatic and color ink jet recording tests were conducted on the coated recording medium using water based inks. The test ink jet printer employed is a 300 dpi printer for wide format printing.

The test procedure employed to determine Critical Integrity Value is as follows:

Samples of non-imaged transmissive specimens are conditioned overnight under TAPPI conditions. The Critical Integrity Value is determined by taking the average of 6 results as tested on a GARDNER Balanced Beam Scrape Adhesion Tester #SG8101 and Hoffman Tool SG-1611. The procedure conforms to ASTM 2197. An even force of about 1 inch per second was used to pull the sample past the Hoffman Tool. Increments of weight were employed to determine the penetration endpoint. The endpoint, or Critical Integrity Value, is that weight which first removes the coating down to the substrate. This endpoint is determined by placing the scored samples representing the different weights on the stage of an overhead projector in a darkened room and observing which weight produces the first visible light transmission onto the screen.

EXAMPLE 1

| | Parts by weight |
|---|---|
| Comb graft polymer A[1] | 1.63 |
| PVP (K-90)[2] | 4.77 |
| Diatomaceous Earth[3] (Superfine Superfloss) | 5.19 |
| P.G.M.E.[4] | 90.36 |
| Pigment to resin ratio (weight/weight) | 0.8:1. |

[1]Comb graft Polymer A - a comb form copolymer of methyl methacrylate backbone grafted with 2-hydroxyethyl methacrylate side chains. Ratio 78/22 by weight. Average molecular weight 35,000.
[2]PVP (K-90) - Poly(N-vinyl pyrrolidone), average molecular weight 360,000. Product of GAF Corporation.
[3]Diatomaceous Earth - Average particle size 4.0 microns. Product of Manville Corporation.
[4]P.G.M.E. - Propylene glycol monomethyl ether.

The solution was coated onto ICI 054 type 3.8 mil polyester film at a coating weight of 6.0 g/m$^2$. The coating obtained was insoluble in water and was not tacky at high humidities.

The film was imaged under TAPPI conditions on a wide format 300 dpi printer using water based inks with an ink drop volume of 120 picoliters. The coating obtained was insoluble in water and was not tacky at high humidities. Solid black image areas were smear proof in less than one minute. Vector lines of about 2 mm wide dried to the touch in less than 10 seconds. The film gave good annotatability with pencils used in manual drafting industry, such as BEROL E3 wax pencils and graphite 4H and 6H drafting pencils. Excellent copies were obtained on a XEROX 4020 Reprocopier.

EXAMPLE 2

| | Parts by weight |
|---|---|
| Comb Graft Polymer B[1] | 1.40 |
| PVP (K-90) | 4.77 |
| Vicron 15/15[2] | 10.31 |
| P.G.M.E. | 85.5 |
| Pigment to Resin ratio (weight/weight) | 1.6:1. |

[1]Comb Graft Polymer B - Comb form copolymer of methylmethacrylate backbone grafted with N-vinyl pyrrolidone side chains. Ratio 65/35 by weight - Average molecular weight - 100,000.
[2]Vicron 15/15 - Calcium Carbonate - Average particle size - 3.7 microns. Product of Pfizer Corporation.

The film was coated and imaged as in Example 1. The coating obtained was insoluble in water and was not tacky at high humidities.

Similar printing tests to those shown in Example 1 were employed. Solid image areas were smear proof in less than 30 seconds and vector lines of about 2 mm wide dried to the touch in less than 5 seconds. The film gave good annotatability with pencils used in the manual drafting industry, such as BEROL E3 wax pencils and graphite 4H and 6H drafting pencils.

EXAMPLE 3

| | Parts by weight |
|---|---|
| Comb Graft Copolymer A | 1.24 |
| PVP (K-90) | 4.77 |
| Min-u-sil (10 microns)[1] | 14.18 |
| P.G.M.E. | 81.80 |
| Pigment to resin ratio (weight/weight) | 2.36:1. |

-continued

[1]Min-u-sil - a crystalline silica having an average particle size of 2.1 microns and a maximum particle size of 10 microns. Product of U.S. Silica Co.

The film was coated and images as in Example 1. The coating obtained was insoluble in water and was not significantly tacky at high humidities. Solid black image areas were smear proof in less than one minute. Vector lines of about 2 mm wide dried to the touch in less than 10 seconds. The film gave good annotatability with pencils used in manual drafting industry, such as BEROL E3 wax pencils and graphite 4H and 6H drafting pencils. Excellent copies were obtained on a XEROX 4020 Reprocopier.

EXAMPLE 4

| | Parts by weight |
|---|---|
| Comb Polymer A | 1.50 |
| PVP (K-90) | 4.77 |
| Imsil 108[1] | 8.32 |
| P.G.M.E. | 87.40 |
| Pigment to resin ratio (weight/weight) | 1.33:1. |

[1]Imsil 108 - Silica. Average particle size is 1.8 microns. Product of Illinois Minerals Co.

The product was coated and imaged as in Example 1. The coating obtained was insoluble in water and was not tacky at high humidities. Solid black image areas were smear proof in less than one minute. Vector lines of about 2 mm wide dried to the touch in less than 10 seconds. The film gave good annotatability with pencils used in manual drafting industry, such as BEROL E3 wax pencils and graphite 4H and 6H drafting pencils. Excellent copies were obtained on a XEROX 4020 Reprocopier.

EXAMPLE 5

| | Parts by weight |
|---|---|
| Image Coating | |
| Comb Polymer A | 1.63 |
| Syloid 74[1] | 5.2 |
| PVP (K-90) | 4.77 |
| P.G.M.E. | 90.40 |
| Pigment to resin ratio (weight to weight) | 0.8:1. |
| Back Coating | |
| Elvacite 2046[2] | 20.0 |
| Starch pigment[3] | 2.3 |
| Methyl Ethyl Ketone | 52.0 |
| Toluene | 52.0 |

[1]Syloid 74 - Amorphous silica. Average particle size 6.0 microns. Product of W. R. Grace & Co.
[2]Elvacite 2046 - A copolymer of n-butyl methacrylate and isobutyl methacrylate. Ratio = 50/50. Product of DuPont de Nemours & Co., Inc.
[3]Starch Pigment - Corn starch, average particle size 16 microns.

The image or face coat was coated on ICI clear polyester film to a coating weight of 8.0 g/m$^2$. The backcoat was coated on the opposite side at a coat weight of 4 g/m$^2$, 10 sheets of the sample were printed in quick succession under TAPPI conditions using the 300 dpi printer. These sheets were received in the stacking tray on top of each other. None exhibited ink offset or smear. Media prepared according to this example exhibited fast ink drying when imaged on a Hewlett Packard 300 dpi ink jet printer. Prints also showed no offset when imaged samples are automatically stacked in the prints receiving tray. Results on UV density change after actual 100 cycles of diazo copying show essentially no loss in actinic opacity. See Table 1 below:

TABLE 1

| | | Number of Copies | | | | |
|---|---|---|---|---|---|---|
| Sample | Item | 0 | 25 | 50 | 75 | 100 |
| Example 5 | Dmax | 0.77 | 0.77 | 0.79 | 0.77 | 0.79 |
| | Dmin | 0.33 | 0.32 | 0.33 | 0.34 | 0.33 |
| | Delta D | 0.44 | 0.45 | 0.46 | 0.43 | 0.46 |

*Diazo copying was performed using a GAF 300 D Diazo machine. Run speed was 10 ft/min. The actinic densities were determined having a MACBETH TD 904 densitometer and an ultraviolet filter.

EXAMPLE 6

| | Parts by weight |
|---|---|
| Imaging Coating | |
| Comb Polymer A | 1.63 |
| PVP - K-90 | 4.77 |
| Syloid 74 | 3.2 |
| P.G.M.E. | 90.50 |
| Pigment to resin ratio | 0.5:1 |
| Top Coat | |
| Cellosize QP4400[1] | 1.2 |
| Syloid 74 | 1.05 |
| Methanol | 5.0 |
| Water | 93.0 |
| Pigment to resin ratio | 0.7:1 |

[1]Cellosize QP 4400 - Hydroxyethyl cellulose. Product of Union Carbide Corp.

The imaging solution was coated on ICI 054 pretreated base to give a coating weight of 7 g/m$^2$. The top coating was applied over this at a coating weight of 1.0 g/m$^2$. The coating obtained was insoluble in water and was not tacky at high humidities. Solid black image areas were smear proof in less than one minute. Vector lines of about 2 mm wide dried to the touch in less than 10 seconds. The film gave good annotatability with pencils used in manual drafting industry, such as BEROL E3 wax pencils and graphite 4H and 6H drafting pencils. Excellent copies were obtained on a XEROX 4020 Reprocopier.

EXAMPLE 7

The solution used in Example 1 was coated on a ICI 339, 3.8 mil opaque white base at a coating weight of 8 g/m$^2$. It was imaged as in Example 1. When used on a XEROX 4020 Reprocopier, excellent reprints were obtained. The material also gave a high contrast print suitable as a presentation print. Again, good annotatability was obtained.

COMPARATIVE EXAMPLE 1

| | Parts by weight |
|---|---|
| Comb Graft Polymer A | 1.63 |
| PVP (K-90) | 4.77 |
| Syloid 74 | 9.60 |
| P.G.M.E. | 90.0 |
| Pigment to resin ratio | 1.5:1. |

This material was coated on to I.C.I. 054, 3.8 mil polyester film at a coat weight of 8.0 g/m$^2$.

The coating was easily scratched and removed from the film. The pigment to hydrogel mass ratio of this formulation exceeded that needed to meet the Critical Integrity Value requirement and thus would be of no use as an annotatable ink jet film.

COMPARATIVE EXAMPLE 2

| | Parts by weight |
|---|---|
| Comb graft Polymer A | 2.1 |
| PVP - K90 | 6.4 |
| Polyethylene Pigment (S-394-N1)[1] | 7.7 |
| P.G.M.E. | 87.0 |
| Pigment to resin ratio | 0.91:1 |

[1]Polyethylene Pigment - S394 N1 - Shamrock Chemical Corp. Average particle size 5 microns. MOH hardness is less than 1.0.

The solution was coated onto ICI 054 polyester film at a coating weight of 8 g/m$^2$. The coating obtained was insoluble in water. Imaged printed dried within 70 seconds when tested as in Example 1. It had, however, poor pencil anotatable characteristics when tested as in Example 1.

COMPARATIVE EXAMPLE 3

| | Parts by weight |
|---|---|
| Comb Graft Polymer A | 3.95 |
| PVP (K-90) | 2.63 |
| Cellite Superfine Superfloss | 5.23 |
| Water | 90.0 |
| Pigment to resin ratio | 1.8:1. |

[1]Vinol 523 - Polyvinyl alcohol polymer - Air Products and Chemicals, Inc.

The solution was coated onto ICI 054 3.8 mil polyester film at a coating weight of 8 g/m$^2$. The coating was soluble in water and was thus inferior to the Examples containing the hydrogels of this invention. It also became soft at high humidities.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. Each of the publications and patents referred herein above are expressly incorporated herein by reference in their entirety.

What is claimed is:

1. A matte film composite which comprises a transparent or opaque substrate, having an at least one side thereof, a water-insoluble, water-absorptive and ink-receptive annotatable matrix layer, the matrix layer comprising a hydrogen complex and a pigment, wherein the mass ratio of the pigment to the hydrogel is 0.2:1 to 3.5:1, the pigment having a MOH hardness of from about 2.2 to 7.0 and an average particle size of from about 0.5 to 10 microns, said matrix having a Critical Integrity Value of not less than 20 g.

2. A matte film composite as recited in claim 1, wherein the hydrogel comprises a poly(N-vinyl heterocyclic) moiety and a complexing agent.

3. A matte film composite which comprises a transparent or opaque substrate, having on at least one side thereof, a water-insoluble, water-absorptive and ink-receptive annotatable matrix layer, the matrix layer comprising a hydrogel complex and a pigment wherein the mass ratio of the pigment to the hydrogen is 0.2:1 to 3.5:1;

wherein the hydrogel comprises a poly(N-vinyl heterocyclic) moiety and a complexing agent, wherein the complexing agent is a water-insoluble comb-graft copolymer;

the pigment having a MOH hardness of from about 2.2 to 7.0 and an average particle size of from about 0.5 to 10 microns; and said matrix having a Critical Integrity Value of not less than 20 g.

4. A matte film composite as recited in claim 3, wherein the water-insoluble comb-graft copolymer contains a hydrophobic backbone and polymeric hydrophilic side chains.

5. A matte film composite as recited in claim 2, wherein the poly(N-vinyl heterocyclic) moiety is selected from the group consisting of poly(N-vinylpyrrolidone) and poly(N-vinyl-4-methyl-2-oxazolidone).

6. A matte film composite as recited in claim 1, wherein the film composite further comprises a backcoat on the opposite side of the ink-receptive matrix layer, said backcoat containing a pigment which provides a Sheffield value of 80–270 Sheffield units.

7. A matte film composite as recited in claim 1, further comprising a topcoat on the ink-receptive matrix layer.

8. A matte film composite as recited in claim 6, further comprising a topcoat on the ink-receptive matrix layer.

9. A matte film composite as recited in claim 7 or 8, wherein said topcoat is more absorptive than the matrix layer thereunder.

10. A matte film composite as recited in claim 1, 6, 7 or 8, wherein said pigment has an average particle size of from about 2.0 to 6.0 microns.

11. A matte film composite as recited in claim 1, 6, 7 or 8, wherein the mass ratio (w/w) of pigment to hydrogel is about 0.2:1 to 3.5:1.

12. A matte film composite as recited in claim 1, 6, 7 or 8, wherein the mass ratio (w/w) of pigment to hydrogel is about 0.5;1 to 2:1.

13. A matte film composite as recited in claim 1, 6, 7 or 8, wherein said pigment has an MOH hardness of from about 4.0 to 7.0.

14. A matte film composite as recited in claim 1, 6, 7 or 8, wherein the coating weight of the ink-receptive matrix layer is from about 2 to 20 $g/m^2$.

15. A matte film composite as recited in claim 1, 6, 7 or 8, wherein the coating weight of the ink-receptive matrix layer is from about 3 to 10 $g/m^2$.

16. A matte film composite as recited in claim 1, 6, 7 or 8, wherein the refractive index of the pigment is from about 1.4 to 1.7.

17. A matte film composite in accordance with claim 1, 6, 7 or 8, wherein the pigment is selected from the group consisting of amorphous and crystalline silica, aluminum trihydrate, calcium carbonate, potassium sodium aluminum silicate, diatomaceous earth, aluminum and magnesium silicates and mixtures thereof.

18. A matte film composite which comprises a transparent or opaque substrate, having on at least one side thereof, a water-insoluble, water-absorptive and ink-receptive matrix layer, the matrix layer comprising a hydrogel complex which comprises a poly-(N-vinyl heterocyclic)moiety and a water-insoluble comb-graft copolymer having a hydrophobic backbone and polymeric hydrophilic side chains and a pigment, the pigment having a MOH hardness of about 2.2 to 7.0 and an average particle size of about 0.5 to 10 microns; said matrix having a Critical Integrity Value of not less than 20 g, with the mass ratio (w/w) of the pigment to hydrogel being about 0.5:1 to 3.5:1, and the coating weight of the matrix layer being from about 3 to 10 $gm^2$.

19. In a process for preparing an ink jet print, the improvement comprising:

providing a matte film composite which comprises a transparent or opaque substrate, having on least one side thereof, a water-insoluble, water-absorptive and ink-receptive annotatable matrix layer, the matrixlayer comprising a hydrogel complex and a pigment, wherein the mass ratio of the pigment to the hydrogel is 0.2:1 to 3.5:1, the pigment having a MOH hardness of from about 2.2 to 7.0 and an average particle size of from about 0.5 to 10 microns, said matrix having a Critical Integrity Value of not less than 20 g.

20. The process of claim 19, wherein the hydrogel comprises a poly(N-vinyl heterocyclic) moiety and a complexing agent.

21. The process of claim 20, wherein the complexing agent is a water-insoluble comb-graft copolymer.

22. In an ink jet printing system, the improvement comprising:

a matte film composite which comprises a transparent or opaque substrate, having on at lest one side thereof, a water-insoluble, water-absorptive and ink-receptive annotatable matrix later, the matrix layer comprising a hydrogel complex and a pigment, wherein the mass ratio of the pigment to the hydrogel is 0.2:1 to 3.5, the pigment having a MOH hardness of from about 2.2 to 7.0 and an average particle size of from about 0.5 to 10 microns, said matrix having a Critical Integrity Value of not less than 20 g.

23. The printing system of claim 22, wherein the hydrogel comprises a poly (N-vinyl heterocyclic) moiety and a complexing agent.

24. The printing system of claim 23, wherein the complexing agent is a water-insoluble comb-graft copolymer.

* * * * *

UNITED STATES PATENT AND TRADEMARK OFFICE

CERTIFICATE OF CORRECTION

PATENT NO. : 5,190,805

DATED : March 2, 1993

INVENTOR(S) : David Atherton, Sen Yang

It is certified that error appears in the above-identified patent and that said Letters Patent is hereby corrected as shown below:

Column 12, line 49, change "hydrogen complex" to --hydrogel complex--

Signed and Sealed this

Thirtieth Day of November, 1993

Attest:

BRUCE LEHMAN

*Attesting Officer*

*Commissioner of Patents and Trademarks*